United States Patent
Zheng et al.

(10) Patent No.: US 12,538,325 B2
(45) Date of Patent: Jan. 27, 2026

(54) TRANSMISSION MODE DETERMINING METHOD AND APPARATUS, AND COMMUNICATIONS DEVICE

(71) Applicant: VIVO MOBILE COMMUNICATION CO., LTD., Guangdong (CN)

(72) Inventors: Kaili Zheng, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 377 days.

(21) Appl. No.: 18/128,183

(22) Filed: Mar. 29, 2023

(65) Prior Publication Data
US 2023/0239896 A1  Jul. 27, 2023

Related U.S. Application Data

(63) Continuation of application No. PCT/CN2021/120821, filed on Sep. 27, 2021.

(30) Foreign Application Priority Data

Sep. 29, 2020 (CN) .......................... 202011051668.0

(51) Int. Cl.
*H04W 72/0446* (2023.01)
*H04B 7/24* (2006.01)
(Continued)

(52) U.S. Cl.
CPC ......... *H04W 72/231* (2023.01); *H04L 5/0053* (2013.01)

(58) Field of Classification Search
CPC ........... H04W 72/231; H04W 72/0446; H04W 56/0035; H04L 5/0053; H04L 5/0035; H04L 5/0094
See application file for complete search history.

(56) References Cited

U.S. PATENT DOCUMENTS

| | | | |
|---|---|---|---|
| 10,187,180 B2 * | 1/2019 | Sorrentino | ............ H04L 1/0026 |
| 11,723,034 B2 * | 8/2023 | Zhou | ..................... H04W 72/23 |
| | | | 370/330 |

(Continued)

FOREIGN PATENT DOCUMENTS

| | | | | |
|---|---|---|---|---|
| CN | 102378275 A | | 3/2012 | |
| CN | 102843652 | * | 12/2012 | ............. H04W 4/06 |

(Continued)

OTHER PUBLICATIONS

3GPP TSG RAN WG1 Meeting#93, R1-1806449 Title:Aspects related to UL data channel (Year: 2018).*

(Continued)

*Primary Examiner* — Faruk Hamza
*Assistant Examiner* — Abusayeed M Haque
(74) *Attorney, Agent, or Firm* — Price Heneveld LLP

(57) ABSTRACT

This application provides a transmission mode determining method and apparatus, and a communications device, and pertains to the field of communications. The method includes: determining a single frequency network transmission mode in a target indication manner, where the target indication manner includes one of the following manners: indication by RRC signaling, indication by TCI state, a manner with a configured or indicated target parameter satisfying a predetermined parameter requirement, and indication of a PDCCH using the SFN transmission mode.

20 Claims, 8 Drawing Sheets

300

S302
In a case that a target indication manner is an indication by RRC signaling, where the RRC signaling is configured with SFN indication information for characterizing an SFN transmission mode, determine, based on the SFN indication information, whether to use the SFN transmission mode S304
Enable the SFN transmission mode by using first signaling

(51) Int. Cl.
  *H04L 5/00* (2006.01)
  *H04W 72/231* (2023.01)

(56) References Cited

U.S. PATENT DOCUMENTS

| | | | |
|---|---|---|---|
| 2014/0119266 A1 | 5/2014 | Ng et al. | |
| 2014/0204825 A1 | 7/2014 | Ekpenyong et al. | |
| 2017/0331577 A1* | 11/2017 | Parkvall | H04W 8/18 |
| 2017/0331670 A1* | 11/2017 | Parkvall | H04W 52/0229 |
| 2018/0220481 A1 | 8/2018 | Seo et al. | |
| 2019/0223169 A1 | 7/2019 | Ren et al. | |
| 2021/0045017 A1* | 2/2021 | Takeda | H04W 76/27 |
| 2021/0195603 A1 | 6/2021 | Jiang et al. | |
| 2022/0095304 A1 | 3/2022 | Muruganathan et al. | |

FOREIGN PATENT DOCUMENTS

| | | |
|---|---|---|
| CN | 102843652 A | 12/2012 |
| CN | 103828258 A | 5/2014 |
| CN | 104770039 A | 7/2015 |
| CN | 104919714 A | 9/2015 |
| CN | 107710705 A | 2/2018 |
| CN | 1083135030 A | 6/2018 |
| CN | 110891313 A | 3/2020 |
| WO | 2019/208994 A1 | 10/2019 |
| WO | 2020144639 A1 | 7/2020 |
| WO | 2020146377 A1 | 7/2020 |

OTHER PUBLICATIONS

3GPP TSG-RAN WG2 Meeting#1113-bis e-meeting R2-2103342 Title: Control pannel aspects of IoT over NTN (Year: 2021).*
CATT, "Study on UE Power Saving in NR," 3GPP TSG RAN Meeting #83, Shenzhen, China, Mar. 18-21, 2018, RP-190297.
International Search Report and Written Opinion of the International Searching Authority dated Dec. 15, 2021 as received in Application No. PCT/CN2021/120821.
SA4, "Reply LS to 'Physical Layer Enhancements for MBMS,'" 3GPP TSG RA WG2#59, R2-073617, Athens, Greece, Aug. 20-24, 2007.
"3rd Generation Partnership Project; Technical Specification Group Radio Access Network; NR; Physical Layer Procedures for Data (Release 16)," 3GPP TS 38.214 V.16.2.0 (Jun. 2020).

* cited by examiner

200

S202

Determine a single frequency network transmission mode in a target indication manner

In a case that a target indication manner is an indication by RRC signaling, where the RRC signaling is configured with SFN indication information for characterizing an SFN transmission mode, determine, based on the SFN indication information, whether to use the SFN transmission mode

S304

Enable the SFN transmission mode by using first signaling

Determine an SFN transmission mode in an indication by a first target TCI state

Determine an SFN transmission mode based on a second target TCI state  S502

600

Determine an SFN transmission mode based on a third target TCI state  S602

Delay spread estimated for TRS1

Delay spread estimated for TRS2

Combined delay spread

700

S702

In a case that a target indication manner is a manner with a configured or indicated target parameter satisfying a predetermined parameter requirement, the predetermined parameter requirement is: the number of target code division multiplexing groups that is for a PDSCH demodulation reference signal port and that is indicated by using DCI is a predetermined group quantity, the number of corresponding TCI states is a predetermined type, and no predetermined enabling parameter configuration is present in an RRC configuration parameter

In a case that a target indication manner is an indication of a PDCCH using an SFN transmission mode, and in a case that the PDCCH is transmitted in the SFN transmission mode, implicitly indicate using the SFN transmission mode for PDSCH

In a case that an SFN transmission mode is used, determine to use a frequency shift pre-compensation function under a target case

TRANSMISSION MODE DETERMINING METHOD AND APPARATUS, AND COMMUNICATIONS DEVICE

CROSS-REFERENCE TO RELATED APPLICATIONS

The present application is a bypass continuation application of International Application No. PCT/CN2021/120821 filed on Sep. 27, 2021, which claims priority to Chinese Patent Application No. 202011051668.0, filed with the China National Intellectual Property Administration on Sep. 29, 2020 and entitled "TRANSMISSION MODE DETERMINING METHOD AND APPARATUS, AND COMMUNICATIONS DEVICE", which are incorporated herein by reference in their entireties.

TECHNICAL FIELD

Embodiments of the present invention relate to the field of communications, and in particular, to a transmission mode determining method and apparatus, and a communications device.

BACKGROUND

In some cases, multiple transmission and reception point (MTRP) transmission modes, for example, MTRP transmission modes in the form of spatial division multiplexing, frequency division multiplexing (FDM), time division multiplexing (TDM), and the like, may be indicated and differentiated by using radio resource control (RRC) higher-layer configuration and physical layer configuration.

However, at present, an MTRP transmission mode in a form of single frequency network (SFN) cannot be indicated, which is not conducive to execution of corresponding processing behavior by a network and a terminal.

SUMMARY

According to a first aspect, a transmission mode determining method is provided, the method is executed by a communications device, and the method includes: determining a single frequency network SFN transmission mode in a target indication manner, where the target indication manner includes one of the following manners: indication by radio resource control RRC signaling, indication by a target transmission configuration indicator state TCI state, a manner with a configured or indicated target parameter satisfying a predetermined parameter requirement, and indication of a physical downlink control channel PDCCH using the SFN transmission mode.

According to a second aspect, a transmission mode determining apparatus is provided, where the apparatus includes: a determining module, configured to determine a single frequency network SFN transmission mode in a target indication manner, where the target indication manner includes one of the following manners: indication by radio resource control RRC signaling, indication by a target transmission configuration indicator state TCI state, a manner with a configured or indicated target parameter satisfying a predetermined parameter requirement, and indication of a physical downlink control channel PDCCH using the SFN transmission mode.

According to a third aspect, a terminal device is provided, where the terminal device includes a processor, a memory, and a program or instructions stored in the memory and capable of running on the processor, and when the program or the instructions are executed by the processor, the steps of the method according to the first aspect are implemented.

According to a fourth aspect, a network device is provided, where the network device includes a processor, a memory, and a program or instructions stored in the memory and capable of running on the processor, and when the program or the instructions are executed by the processor, the steps of the method according to the first aspect are implemented.

According to a fifth aspect, a readable storage medium is provided, where a program or instructions are stored in the readable storage medium, and when the program or the instructions are executed by a processor, the steps of the method according to the first aspect are implemented.

According to a sixth aspect, a computer program product is provided, where the computer program product includes a processor, a memory, and a program or instructions stored in the memory and capable of running on the processor, and when the program or the instructions are executed by the processor, the steps of the method according to the first aspect are implemented.

According to a seventh aspect, a chip is provided, where the chip includes a processor and a communications interface, the communications interface is coupled to the processor, and the processor is configured to run a program or instructions to implement the method according to the first aspect.

BRIEF DESCRIPTION OF THE DRAWINGS

The accompanying drawings described herein are intended for better understanding of this application and constitute a part of this application. Illustrative embodiments and descriptions thereof in this application are intended to interpret this application without constituting any improper limitation on this application. In the accompanying drawings:

FIG. 2 is a schematic flowchart of a transmission mode determining method according to an embodiment of the present invention;

FIG. 3 is a schematic flowchart of a transmission mode determining method according to an embodiment of the present invention;

FIG. 4 is a schematic flowchart of a transmission mode determining method according to an embodiment of the present invention;

FIG. 7 is a schematic flowchart of a transmission mode determining method according to an embodiment of the present invention;

FIG. 8 is a schematic flowchart of a transmission mode determining method according to an embodiment of the present invention;

FIG. 9a is a schematic flowchart of a transmission mode determining method according to an embodiment of the present invention;

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE) or LTE-Advanced (LTE-A) system, and may also be applied to other wireless communications systems, for example, code division multiple access (CDMA), time division multiple access TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation ($6^{th}$ Generation, 6G) communications system.

Figure 1:
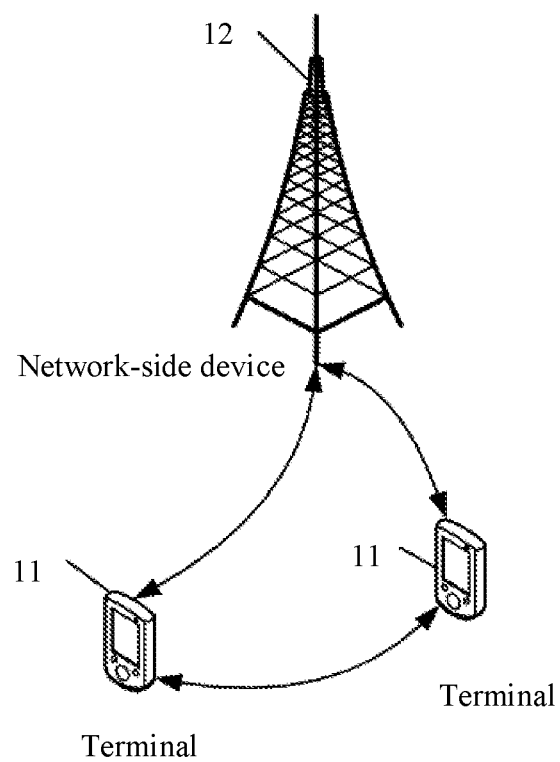
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), macro base station, Pico base station, relay station, remote radio unit (RRU), remote radio head (RRH), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a transmission mode determining method provided in the embodiments of this application by using specific embodiments and application scenarios thereof with reference to the accompanying drawings.

As shown in FIG. 2, an embodiment of the present invention provides a transmission mode determining method 200. The method may be executed by a terminal device and/or a network device. In other words, the method may be executed by software or hardware installed in the terminal device and/or the network device. The method includes the following step.

S202: Determine a single frequency network transmission mode in a target indication manner.

The SFN transmission mode includes: in a case that SFN is deployed, a plurality of RRHs are connected to one BBU, so that a terminal does not need to hand over between base stations frequently during high-speed movement. Based on this, it is necessary to distinguish whether to use the SFN transmission mode, and in this step, whether to use the single frequency network SFN transmission mode is determined in the following target indication manner.

The target indication manner includes one of the following manners: indication by radio resource control RRC signaling, indication by a target transmission configuration indicator state TCI state, a manner with a configured or indicated target parameter satisfying a predetermined parameter requirement, and indication of a physical downlink control channel PDCCH using the SFN transmission mode.

The transmission mode determining method provided in this embodiment of the present invention may be executed by the terminal device or the network device, and the determining a single frequency network SFN transmission mode in a target indication manner includes the following implementation manners.

In a case that the execution subject is the network device, the network device indicates the SFN transmission mode to UE in the target indication manner; and in a case that the execution subject is the UE, the UE determines the SFN transmission mode in the target indication manner. In this way, an MTRP transmission mode in a form of SFN can be determined, so that the network device and the terminal device can send or receive data based on the SFN transmission mode. It can be ensured that the network and the terminal have correct understanding on whether to implement the SFN mode, so that the terminal can correctly understand that the network is to perform physical downlink shared channel (PDSCH) or physical downlink control channel (PDCCH) transmission in the SFN transmission mode, and then the terminal performs corresponding channel monitoring.

As shown in FIG. 3, an embodiment of the present invention provides a transmission mode determining method 300. The method may be executed by a terminal device and/or a network device. In other words, the method may be executed by software or hardware installed in the terminal device and/or the network device. The method includes the following steps.

S302: In a case that a target indication manner is an indication by RRC signaling, where the RRC signaling is configured with SFN indication information representing an SFN transmission mode, determine, based on the SFN indication information, whether to use the SFN transmission mode.

The transmission mode determining method provided in this embodiment of the present invention may be executed by the terminal device or the network device. If this step is performed by the network device, the network device configures the RRC signaling, and the RRC signaling is configured with the SFN indication information representing the SFN transmission mode. The RRC signaling is sent to the UE, so as to determine, based on the SFN indication information, whether to use the SFN transmission mode.

In a case that this step is performed by the UE, the UE receives the RRC signaling, and the RRC signaling is configured with the SFN indication information representing the SFN transmission mode. The UE determines, based on the SFN indication information, whether the network uses the SFN transmission mode for PDSCH or PDCCH transmission.

S304: Enable the SFN transmission mode by using first signaling.

The first signaling is indicated by using medium access control control element (MAC CE) or downlink control information (DDCI). For example, the SFN transmission mode may be enabled by using a target field in the MAC CE or DCI.

For example, in step S302, the SFN transmission mode is determined in the form of RRC signaling, and an 'sfn' field representing the SFN transmission mode may be added to a RepetitionSchemeConfig information element of RRC. One of fdm-TDM, slotBased, and sfn is selected and configured in the RRC signaling, and a configuration form of the sfn field may be ENUMERATED or SetupRelease. SFN transmission is enabled when the network configures the 'sfn' field in the RRC message.

In an implementation, in step S304, when the 'sfn' field is configured in the RRC message by the network and is activated by using a specific field for SFN transmission in the MAC CE, SFN transmission is enabled; or, in step S304, when the 'sfn' field is configured in the RRC message by the network and is indicated implicitly by using another piece of related MAC CE signaling that has been defined, for example, MAC CE signaling used for activating or indicating a TCI state, SFN transmission is enabled.

In another implementation, in step S304, when the 'sfn' field is configured in the RRC message by the network and is indicated by using a specific DCI field for SFN transmission, SFN transmission is enabled.

In another implementation, in step S304, when the 'sfn' field is configured in the RRC message by the network and is indicated implicitly by using another piece of related DCI signaling that has been defined, for example, DCI signaling used for activating or indicating a TCI state, SFN transmission is enabled.

In the transmission mode determining method provided in this embodiment of the present invention, in the case that the target indication manner is the indication by RRC signaling, the RRC signaling is configured with the SFN indication information representing the SFN transmission mode, and whether to use the SFN transmission mode is determined based on the SFN indication information. In this way, the MTRP transmission mode in the form of SFN can be determined, so that the network device and the terminal device can send or receive data based on the SFN transmission mode, ensuring that the network and the terminal have correct understanding on whether the other side executes the SFN mode.

As shown in FIG. 4, an embodiment of the present invention provides a transmission mode determining method 400. The method may be executed by a terminal device and/or a network device. In other words, the method may be executed by software or hardware installed in the terminal device and/or the network device. The method includes the following step.

S402: Determine an SFN transmission mode in an indication by first target TCI state.

The target indication manner is an indication by a target transmission configuration indicator (TCI) state, and the target TCI state is the first target TCI state, where the first target TCI state is associated with a first target quasi-co-location type (QCL-type), where the first target QCL-type includes at least one of the following QCL-types:

a first QCL-Type, where an element included in the first QCL-Type is delay spread;

a second QCL-Type, where elements included in the second QCL-Type are average delay and delay spread;

a third QCL-Type, where elements included in the third QCL-Type are Doppler spread, average delay, and delay spread; and a fourth QCL-Type, where elements included in the fourth QCL-Type are Doppler shift, Doppler spread, and delay spread.

Quasi co-location (QCL) indicates that average delay, delay spread, Doppler shift, Doppler spread, and spatial reception parameter of a channel experienced by a symbol on an antenna port can be derived based on another antenna port. There are four different types of QCL relationships in new radio (NR), applicable to different transmission scenarios.

(1) QCL-TypeA, {Doppler shift, Doppler spread, average delay, delay spread}.
(2) QCL-TypeB, {Doppler shift, Doppler spread}.
(3) QCL-TypeC, {Doppler shift, average delay}.
(4) QCL-TypeD, {spatial reception parameter}.

Generally, a tracking reference signal (TRS) is configured to the DMRS in the form of QCL-TypeA for QCL reference. TCI is used to indicate a QCL reference relationship between reference signals. In the MTRP scenario, two TCI states are usually indicated at the same time. One TCI state includes a maximum of two QCL reference sources, and QCL-Types corresponding to the two QCL reference sources in the one TCI state cannot be the same. If two QCL reference sources are associated with one TCI state, a QCL-Type of one of the QCL reference sources needs to be QCL-TypeD.

An example of a TCI state configuration is described below. One TCI state is indicated to PDSCH DMRS by using DCI, and the TCI state is associated with two QCL reference sources: one TRS resource and one CSI-RS for BM resource. The TRS resource corresponds to QCL-TypeA, and the CSI-RS for BM resource corresponds to QCL-TypeD.

However, in this step, it can be understood that the first target QCL-type is newly defined in addition to the foregoing four QCL types, and in a case that the first target TCI state is associated with the first target QCL-type, the SFN transmission mode is determined based on the first target TCI state.

In an implementation, the first target TCI state may be configured or indicated by using RRC, MAC CE, or DCI. In a case that this step is performed by the network device, the network device may configure or indicate the first target TCI state by using RRC, MAC CE or DCI target TCI state, and indicate the SFN transmission mode by using the first target TCI state. Correspondingly, in a case that this step is performed by the UE, the UE receives the first target TCI state configured or indicated by the network device by using RRC, MAC CE, or DCI, and determines whether the network uses the SFN transmission mode for PDSCH or PDCCH transmission.

In addition, in an implementation, in a case that a first preset condition is satisfied, this step is performed, that is, in a case that the first preset condition is satisfied, the SFN transmission mode is determined based on the first target TCI state. The first preset condition includes at least one of the following:

for PDSCH or PDCCH, a TCI state associated with the first target QCL-type is present in TCI states indicated by using RRC.

for PDSCH, a TCI state associated with the first target QCL-type is present in TCI states activated by using MAC CE;

for PDCCH, a TCI state associated with the first target QCL-type is present in TCI states indicated by using MAC CE; and for PDSCH, a TCI state associated with the first target QCL-type is present in TCI states indicated by using DCI.

For example, a plurality of newly defined possible first target QCL-types are shown below.

QCL-TypeE1, containing an element {delay spread};
QCL-TypeE2, containing elements {average delay, delay spread};
QCL-TypeE3, containing elements {Doppler spread, average delay, delay spread}; and
QCL-TypeE4, containing elements {Doppler shift, Doppler spread, delay spread}.

In an implementation, PDSCH or PDCCH DMRS may refer to TRS in a manner of QCL-TypeE1/E2/E3.

In an implementation, TRS may refer to TRS in a manner of QCL-TypeE1/E2/E3.

In an implementation, CSI reference signal (CSI-RS) may refer to TRS in a manner of QCL-TypeE1/E2/E3.

In an implementation, PDSCH/PDCCH DMRS may refer to TRS in a manner of QCL-TypeE4.

In an implementation, CSI-RS may refer to TRS in a manner of QCL-TypeE4.

For example, in case 1, eight TCI states are configured for PDCCH or PDSCH by using RRC: TCI state 1, TCI state 2, . . . , and TCI state 8. One QCL reference source associated with TCI state 2 is TRS resource 2, and QCL-Type is QCL-TypeE3; in this case, the SFN transmission mode is enabled.

In case 2, 10 TCI states are configured for PDSCH by using RRC: TCI state 1, TCI state 2, . . . , and TCI state 10. One QCL source associated with TCI state 2 is TRS resource 2, and the QCL-Type is QCL-TypeE3. TCI state 1 to TCI state 8 in the 10 TCI states are activated by using MAC CE. TCI state 2 is present in the 8 TCI states activated by using the MAC CE, and therefore the SFN transmission mode is enabled.

In case 3, 10 TCI states are configured for PDCCH by using RRC: TCI state 1, TCI state 2, . . . , and TCI state 10. One QCL source associated with TCI state 2 is TRS resource 2, and the QCL-Type is QCL-TypeE3. As indicated by the MAC CE, TCI state 2 in the 10 TCI states is used as QCL reference of PDCCH DMRS, and therefore the SFN transmission mode is enabled.

In case 4, 10 TCI states are configured for PDSCH by using RRC: TCI state 1, TCI state 2, . . . , and TCI state 10. One QCL source associated with TCI state 2 is TRS resource 2, and the QCL-Type is QCL-TypeE3. TCI state 1 to TCI state 8 in the 10 TCI states are activated by using MAC CE, and TCI state 2 in the 8 TCI states activated by using the MAC CE is finally indicated as QCL reference of PDSCH DMRS. In this case, the SFN transmission mode is enabled.

In the foregoing cases 1 to 4, the newly defined TCI state being QCL-TypeE3 is merely used as an example, and QCL-TypeE3 may be replaced by any other newly defined TCI state.

In the transmission mode determining method provided in this embodiment of the present invention, in the case that the target indication manner is the indication by a target TCI state and the target TCI state is the first target TCI state, the first target TCI state is associated with the first quasi co-location type QCL-type, and an MTRP transmission mode in the form of SFN can be indicated by using a newly defined QCL-type, so that the network device and the terminal device can send or receive data based on the SFN transmission mode, ensuring that the network and the terminal have correct understanding on whether the other side executes the SFN mode.

Figures 5, 6A, 6B:
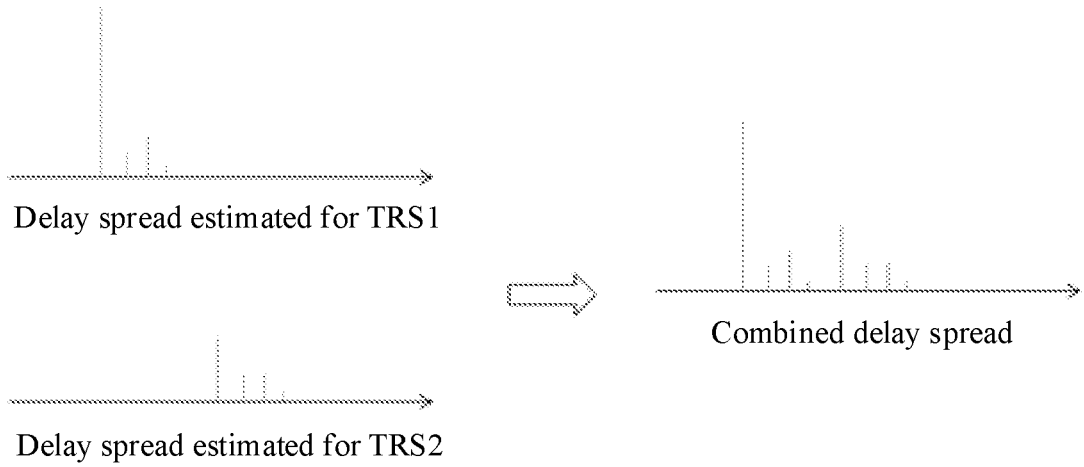
FIG. 5 is a schematic flowchart of a transmission mode determining method according to an embodiment of the present invention.
FIG. 6a is a schematic flowchart of a transmission mode determining method according to an embodiment of the present invention.
FIG. 6b is a schematic diagram of repeated references being combined.

As shown in FIG. 5, an embodiment of the present invention provides a transmission mode determining method 500. The method may be executed by a terminal device and/or a network device. In other words, the method may be executed by software or hardware installed in the terminal device and/or the network device. The method includes the following step.

S502: Determine an SFN transmission mode based on a second target TCI state.

The target indication manner is an indication by a target TCI state and the target TCI state is a second target TCI state. The second target TCI state is associated with a target association relationship between uplink signals and downlink signals, and an element included in the target association relationship between uplink signals and downlink signals includes Doppler shift, for example, being Doppler shift.

In an implementation, the second target TCI state may be configured or indicated by using RRC, MAC CE, or DCI. In a case that this step is performed by the network device, the network device may configure or indicate the second target TCI state by using RRC, MAC CE or DCI target TCI state, and indicate the SFN transmission mode by using the second target TCI state. Correspondingly, in a case that this step is performed by the UE, the UE receives the second target TCI state configured or indicated by the network device by using RRC, MAC CE, or DCI, and then determines whether the network uses the SFN transmission mode for PDSCH or PDCCH transmission.

In an implementation, this step is performed in a case that a second preset condition is satisfied, that is, in the case that the second preset condition is satisfied, the SFN transmission mode is determined based on the second target TCI state.

The second preset condition includes at least one of the following:
- for PDSCH or PDCCH, a TCI state associated with the target association relationship between uplink signals and downlink signals is present in TCI states configured by using RRC;
- for PDSCH, a TCI state associated with the target association relationship between uplink signals and downlink signals is present in TCI states activated by using MAC CE;
- for PDCCH, a TCI state associated with the target association relationship between uplink signals and downlink signals is present in TCI states indicated by using MAC CE; and
- for PDSCH, a TCI state associated with the target association relationship between uplink signals and downlink signals is present in TCI states indicated by using DCI.

For example, for association relationship {Doppler shift}, the association relationship between uplink signals and downlink signals can be used in cases, including but not limited to: uplink sounding reference signal (SRS) is associated with Doppler shift of downlink TRS, PUSCH or PUCCH DMRS is associated with Doppler shift of downlink TRS, and so on.

As shown in FIG. 6a, an embodiment of the present invention provides a transmission mode determining method 600. The method may be executed by a terminal device and/or a network device. In other words, the method may be executed by software or hardware installed in the terminal device and/or the network device. The method includes the following step.

S602: Determine an SFN transmission mode based on a third target TCI state.

A target indication manner is an indication by a target TCI state, and the target TCI state is the third target TCI state. At least two target downlink reference signal resources are present in a plurality of downlink reference signal resources associated with the third target TCI state, and a QCL-Type corresponding to the target downlink reference signal resource is non-QCL-TypeD. This step can be understood as defining a new TCI state, that is, the third target TCI state is used for determining the SFN transmission mode.

In an implementation, the third target TCI state may be configured or indicated by using RRC, MAC CE, or DCI. In a case that this step is performed by the network device, the network device may configure or indicate the third target TCI state by using RRC, MAC CE or DCI target TCI state, and indicate the SFN transmission mode by using the third target TCI state. Correspondingly, in a case that this step is performed by the UE, the UE receives the third target TCI state configured or indicated by the network device by using RRC, MAC CE, or DCI, and then determines whether the network uses the SFN transmission mode for PDSCH or PDCCH transmission.

In an implementation, this step is performed in a case that a third preset condition is satisfied, that is, in the case that the third preset condition is satisfied, the SFN transmission mode is determined based on the third target TCI state.

The third preset condition includes at least one of the following:
- for PDSCH or PDCCH, the third target TCI state is present in TCI states configured by using RRC;
- for PDSCH, the third target TCI state is present in TCI states activated by using MAC CE;
- for PDCCH, the third target TCI state is present in TCI states indicated by using MAC CE; and
- for PDSCH, the third target TCI state is present in TCI states indicated by using DCI.

In addition, in an implementation, in a case that the target downlink reference signal resources correspond to a same QCL-Type, one of a plurality of downlink reference signal resources corresponding to the same QCL-Type is an anchor, and the anchor is preset or indicated by a network according to a predetermined rule. In addition, QCL-Types corresponding to the target downlink reference signal resources may alternatively be different. According to a predetermined rule, for example, a reference signal resource ranking top in an order of TCI states is preset as the anchor.

In an implementation, after the determining a single frequency network SFN transmission mode in a target indication manner, the method may further include: jointly referring to a repetition element in the QCL-Type of the at least two target downlink reference signal resources.

For example, a form of the foregoing new TCI state may be as follows:

(1) Four TRS resources are associated with the TCI state, that is, TRS resource 1 corresponding to QCL-TypeA; TRS resource 2 corresponding to QCL-TypeA; CSI-RS resource 3 corresponding to QCL-TypeD; and CSI-RS resource 4 corresponding to QCL-TypeD.

(2) Four TRS resources are associated with the TCI state, that is, TRS resource 1 corresponding to QCL-TypeA; TRS resource 2 corresponding to QCL-TypeE1; CSI-RS resource 3 corresponding to QCL-TypeD; and CSI-RS resource 4 corresponding to QCL-TypeD.

The foregoing (2) merely uses QCL-TypeE1 as an example, and QCL-TypeE1 may be replaced by any other newly defined QCL-Types, for example, any one or more of the newly defined QCL-Types E1 to E4 described in the embodiment of FIG. 4.

For the case (1), because two TRS resources both correspond to QCL-TypeA, one of the TRS resources may need to be set as the anchor to provide complete QCL-TypeA reference, while the non-anchor TRS resource is merely used for providing QCL reference items such as {delay spread} or {average delay, delay spread} or {Doppler spread, average delay, delay spread} or {Doppler shift, Doppler spread, delay spread} in QCL-TypeA.

For example, the following may be included: as indicated by MAC CE or DCI, TRS resource 1 serves as the anchor. In this case, the TRS resource 1 provides complete QCL-TypeA reference items {Doppler shift, Doppler spread, average delay, delay spread}; the TRS resource 2 merely provides {delay spread}, or {average delay, delay spread}, or {Doppler spread, average delay, delay spread}, or {Doppler shift, Doppler spread, delay spread}; and the CSI-RS resource 3 and CSI-RS resource 4 each provide corresponding {spatial parameter}.

For example, the following may be included: in an order of sequence numbers of higher-layer QCL-Type parameters, a TRS resource corresponding to a QCL-Type parameter ranking top is used as the anchor. For example, higher-layer parameter qcl-Type1 corresponds to TRS resource 1, higher-layer parameter qcl-Type2 corresponds to CSI-RS resource 3, higher-layer parameter qcl-Type3 corresponds to TRS resource 2, and higher-layer parameter qcl-Type4 corresponds to CSI-RS resource 4. In this case, the TRS resource 1 serves as an anchor to provide complete QCL-TypeA reference items {Doppler shift, Doppler spread, average delay, delay spread}, while TRS resource 2 merely provides {delay spread}, or {average delay, delay spread}, or {Doppler spread, average delay, delay spread}, or {Doppler shift, Doppler spread, delay spread}, and CSI-RS resource 3 and CSI-RS resource 4 each provide corresponding {spatial parameter}.

In addition, regardless of the case (1) or (2), when a plurality of reference signals with a reference type being non-QCL-TypeD provide repeated QCL reference items, the terminal needs to combine the two during processing. The following uses (2) as an example for description. TRS resource 1 corresponds to QCL-TypeA and TRS resource 2 corresponds to QCL-TypeE1, and therefore the two have a repeated QCL reference item {delay spread}. In this case, during processing, the terminal needs to combine a delay spread provided by TRS resource 1 with a delay spread provided by TRS resource 2, and calculate a combined delay spread, as shown in FIG. 6b. In other cases, type combination processing is also performed. For example, TRS resource 1 and TRS resource 2 both provide Doppler spread, and the terminal also needs to combine information of the two to calculate a combined Doppler spread.

The step of determining the SFN transmission mode based on the third target TCI state is described by using an example. For example, in case 1, eight TCI states are configured for PDCCH or PDSCH by using RRC: TCI state 1, TCI state 2, . . . , and TCI state 8. TCI state 1 is associated with four QCL reference sources, that is, TRS resource 1 corresponding to QCL-TypeA, TRS resource 2 corresponding to QCL-TypeA, CSI-RS resource 3 corresponding to QCL-TypeD, and CSI-RS resource 4 corresponding to QCL-TypeD. In this case, the SFN transmission mode is enabled.

In case 2, 10 TCI states are configured for PDSCH by using RRC: TCI state 1, TCI state 2, . . . , and TCI state 10. TCI state 1 is associated with four QCL reference sources, that is, TRS resource 1 corresponding to QCL-TypeA, TRS resource 2 corresponding to QCL-TypeA, CSI-RS resource 3 corresponding to QCL-TypeD, and CSI-RS resource 4 corresponding to QCL-TypeD. TCI state 1 to TCI state 8 in the 10 TCI states are activated by using MAC CE. TCI state 1 is present in the 8 TCI states activated by using the MAC CE, and therefore the SFN transmission mode is enabled.

In case 3, 10 TCI states are configured for PDCCH by using RRC: TCI state 1, TCI state 2, . . . , and TCI state 10. TCI state 1 is associated with four QCL reference sources, that is, TRS resource 1 corresponding to QCL-TypeA, TRS resource 2 corresponding to QCL-TypeA, CSI-RS resource 3 corresponding to QCL-TypeD, and CSI-RS resource 4 corresponding to QCL-TypeD. As indicated by the MAC CE, TCI state 1 in the 10 TCI states is used as QCL reference of PDCCH DMRS. In this case, the SFN transmission mode is enabled.

In case 4, 10 TCI states are configured for PDSCH by using RRC: TCI state 1, TCI state 2, . . . , and TCI state 10. TCI state 1 is associated with four QCL reference sources, that is, TRS resource 1 corresponding to QCL-TypeA, TRS resource 2 corresponding to QCL-TypeA, CSI-RS resource 3 corresponding to QCL-TypeD, and CSI-RS resource 4 corresponding to QCL-TypeD. TCI state 1 to TCI state 8 in the 10 TCI states are activated by using MAC CE, and TCI state 1 in the 8 TCI states activated by using the MAC CE is finally indicated as QCL reference of PDSCH DMRS. In this case, the SFN transmission mode is enabled.

According to the transmission mode determining method provided in this embodiment of the present invention, a new TCI state form can be defined for determining the SFN transmission mode.

As shown in FIG. 7, an embodiment of the present invention provides a transmission mode determining method 700. The method may be executed by a terminal device and/or a network device. In other words, the method may be executed by software or hardware installed in the terminal device and/or the network device. The method includes the following step.

S702: In a case that the target indication manner is the manner with the configured or indicated target parameter satisfying the predetermined parameter requirement, the predetermined parameter requirement is: the number of target code division multiplexing (CDM) groups that is for a PDSCH demodulation reference signal (DMRS) port and that is indicated by using DCI is a predetermined group quantity, the number of corresponding TCI states is a predetermined type, and no predetermined enabling parameter configuration is present in an RRC configuration parameter.

For example, in an implementation, in a case that the number of CDM groups of a PDSCH DMRS port indicated by DCI is 1, the number of corresponding TCI States is 2, and there is no higher-layer parameter configuration RepSchemeEnabler, the SFN transmission mode is enabled.

As shown in FIG. 8, an embodiment of the present invention provides a transmission mode determining method 800. The method may be executed by a terminal device and/or a network device. In other words, the method may be executed by software or hardware installed in the terminal device and/or the network device. The method includes the following step.

S802: In a case that the target indication manner is the indication manner with PDCCH using the SFN transmission mode, and in a case that the PDCCH is transmitted in the SFN transmission mode, implicitly indicate using the SFN transmission mode for PDSCH.

In a case that this step is performed by the network device, the network device performs PDCCH transmission in the SFN transmission mode, and implicitly indicates to the UE that PDSCH transmission is to be also performed in the form of SFN. Correspondingly, when this step is performed by the UE, PDCCH received by the UE is transmitted in the SFN transmission mode, and the UE expects that PDSCH transmission is to be also performed in the form of SFN.

As shown in FIG. 9a, an embodiment of the present invention provides a transmission mode determining method 900. The method may be executed by a terminal device and/or a network device. In other words, the method may be executed by software or hardware installed in the terminal device and/or the network device. The method includes the following step.

S902: In a case that an SFN transmission mode is used, determine to use a frequency shift pre-compensation function in a target case.

Figure 9B:
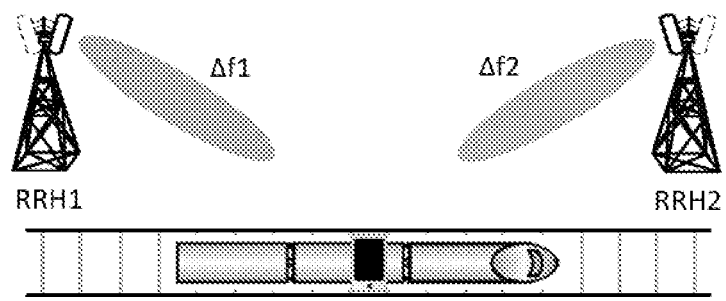
FIG. 9b is a schematic diagram of frequency shift precompensation in an SFN transmission mode.

FIG. 9b is a schematic diagram of frequency shift pre-compensation in the SFN transmission mode. In a case that an SFN network is deployed, a plurality of RRHs are connected to one BBU, so that a terminal does not need to hand over between base stations frequently during high-speed movement. However, when the plurality of RRHs send same data to the terminal, due to different positional relationships between the terminal and the plurality of RRHs, signals transmitted by the plurality of RRHs and arriving at the terminal have different delay, power, and Doppler frequency shift. In particular, a difference in Doppler frequency shift severely affects data demodulation performance of the terminal. For example, in a high-speed rail scenario, when the terminal moves between two RRHs, Doppler shift from RRH1 on the left is $\Delta f1$, and Doppler shift from RRH2 on the right is $\Delta f2$. In this case, values of $\Delta f1$ and $\Delta f2$ are similar; however, one is positive and the other is negative, so that the terminal cannot correctly demodulate received data.

In order to resolve the problem that the terminal is affected by a plurality of Doppler shifts, the base station may estimate a Doppler shift based on uplink signals, and perform pre-compensation in advance for data reception of the terminal, which are usually performed in the following steps:

Step 1: Send synchronization signal block (Synchronization Signal and PBCH block, SSB) resource sets SSB1 and SSB2 from RRH1 and RRH2 respectively.

Step 2: The terminal roughly estimates frequency shifts $\Delta f1$ and $\Delta f2$ based on SSB1 and SSB2, respectively, and adjusts e crystal oscillator frequency based on a frequency shift estimation result of SSB1 or SSB2. For example, the terminal adjusts the crystal oscillator frequency to fc+$\Delta f1$ (fc is the crystal oscillator frequency of the base station) based on an estimation result $\Delta f1$ of the SSB1.

Step 3: Send TRS resource sets TRS1 and TRS2 from RRH1 and RRH2 respectively.

Step 4: The terminal accurately estimates current frequency shifts $\Delta f1'$ and $\Delta f2'$ based on TRS1 and TRS2 respectively (without considering an estimation error of SSBs and TRSs, $\Delta f1'=0$, and $\Delta f2'=\Delta f2-\Delta f1$), and adjusts the crystal oscillator frequency based on a frequency shift estimation result of TRS1 or TRS2, for example, adjusts the crystal oscillator frequency to fc+$\Delta f1$+$\Delta f1'$ based on an estimation result $\Delta f1'$ of TRS1.

Step 5: The terminal sends an uplink SRS reference signal at the frequency fc+$\Delta f1$+$\Delta f1'$, and the base station estimates Doppler shifts $\Delta f1$ and $\Delta f2$ based on the SRS reference signal or other reference signals.

Step 6: The base station keeps downlink frequency of RRH1 still at fc, adjusts downlink frequency of RRH2 to fc+$\Delta f1$-$\Delta f2$, and transmits downlink PDSCH data.

Step 7: The terminal receives the downlink PDSCH data.

Doppler shift has been pre-compensated in step 6, and therefore the downlink PDSCH data received by the terminal in step 7 is free of severe opposite Doppler shifts. Without considering an estimation error, opposite Doppler shift values of two symbols are eliminated to 0. In this step, in a target case, it is determined to use the frequency shift pre-compensation function, so that the terminal can correctly demodulate the received data.

This step may include determining to use the frequency shift pre-compensation function in a case that the SFN transmission mode is used. That is, in a case that the network explicitly or implicitly indicates using the SFN transmission mode for transmission, the frequency shift pre-compensation function is also enabled.

The target case includes one of the following:
a case that second signaling used for indicating enabling of the frequency shift pre-compensation function is configured or indicated by the network:
in a case that the network device performs this step, the network device sends to the UE the second signaling used for indicating enabling of the frequency shift pre-compensation function, so as to indicate the UE to use the frequency shift pre-compensation function; correspondingly, in a case that the UE performs this step, the UE receives, from the network device, the second signaling used for indicating enabling of the frequency shift pre-compensation function, to determine to use the frequency shift pre-compensation function; and the network device may configure or indicate the second signaling by using RRC, MAC CE, or DCI; and
in addition, the network may alternatively configure or indicate signaling used for indicating disabling or turning-off of the frequency shift pre-compensation function; and according to the signaling, the UE determines to disable or turn off the frequency shift pre-compensation function;
a case that a TCI state indicated by using third signaling is associated with an association relationship between uplink signals and downlink signals, and an element of the association relationship includes Doppler shift, which may specifically include the following content:
a case that a TCI state indicated by using the third signaling is associated with an association relationship between uplink reference signals and downlink reference signals, and an element of the association relationship includes Doppler shift, and a case that a TCI state indicated by using the third signaling is associated with an association relationship between uplink physical channels and downlink reference signals, and an element of the association relationship includes Doppler shift;
a case that a TCI state indicated by using fourth signaling is associated with a second target QCL-Type, and an element corresponding to the second target QCL-Type does not include Doppler shift; and
a case that fifth signaling is used to indicate that a target tracking reference signal TRS or a target synchronization signal block SSB resource is used as an anchor for adjusting carrier frequency and/or timing, where for example,
the fifth signaling indicates 0 or has no indication, which means not enabling "frequency shift pre-compensation";
the fifth signaling indicates 1, which means enabling "frequency shift pre-compensation" and that the UE needs to refer to RS corresponding to the 1st TCI state in codepoint {TCI state 1, TCI state 2} as an anchor;
the fifth signaling indicates 2, which means enabling "frequency shift pre-compensation" and that the UE needs to refer to RS corresponding to the 2nd TCI state in codepoint {TCI state 1, TCI state 2} as an anchor.

Similar to the second signaling, in a case that this step is performed by the network device, the network device may send the third signaling, the fourth signaling, or the fifth signaling to the UE, so as to indicate to the UE whether to use the frequency shift pre-compensation function. Correspondingly, in a case that this step is performed by the UE, the UE receives the third signaling, the fourth signaling, or the fifth signaling configured or indicated by the network device, to determine whether to use the frequency shift pre-compensation function.

The third signaling, the fourth signaling, and the fifth signaling may be configured or indicated by using RRC, MAC CE, or DCI. The third signaling, the fourth signaling, and the fifth signaling may use the same signaling or different signaling.

In an implementation, in a case that use of the frequency shift pre-compensation function is determined, an uplink frequency may be adjusted based on a Doppler shift in a TCI state corresponding to PDSCH or PDCCH DMRS. For example, in a case that use of the frequency shift pre-compensation function is determined, the terminal may adjust an uplink frequency based on a Doppler shift in a TCI state corresponding to PDSCH or PDCCH DMRS.

Therefore, according to the transmission mode determining method provided in this embodiment of the present invention, the SFN transmission mode can be determined and whether to enable frequency shift pre-compensation can be determined in a plurality of explicit or implicit manners, so that the network and the terminal perform corresponding processing.

Figure 10:
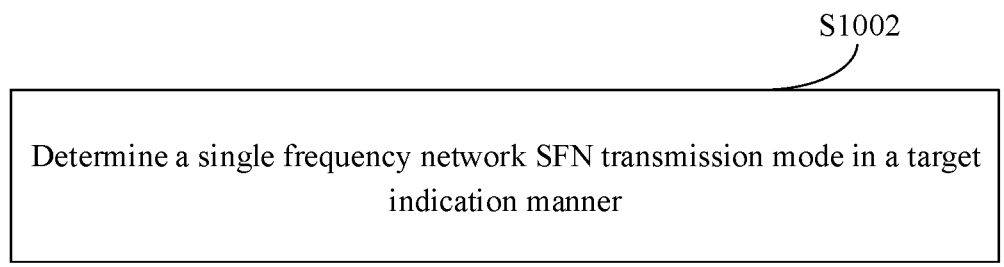
FIG. 10 is a schematic flowchart of a transmission mode determining method according to an embodiment of the present invention.

As shown in FIG. 10, an embodiment of the present invention provides a transmission mode determining method 1000. The method may be executed by a terminal device and/or a network device. In other words, the method may be executed by software or hardware installed in the terminal device and/or the network device. The method includes the following step.

S1002: Determine a single frequency network SFN transmission mode in a target indication manner.

For this step, description of the embodiment in FIG. 2 may be used, and is not repeated herein.

On a basis of using the SFN transmission mode, in a case that a predetermined parameter is included in an RRC parameter, one transport block is transmitted on a plurality of slot-level PDSCHs, and PDSCHs in all slots are transmitted in the SFN transmission mode.

In an implementation, the higher layer is not allowed to configure a predetermined enabling parameter, for example, a SlotBased-r16 field.

In an implementation, in a case that a predetermined enabling parameter has been configured, the predetermined enabling parameter is caused not to take effect. For example, if the higher layer configures the SlotBased-r16 field, it does not take effect by default, or if the higher layer configures the SlotBased-r16 field, the SlotBased-r16 takes effect only for PDSCH-TimeDomainResourceAllocation excluding the RepNumR16 parameter in pdsch-TimeDomainAllocation-List.

According to the transmission mode determining method provided in this embodiment of the present invention, the SFN can be combined with a slot-based repetition transmission scheme.

Figure 11:
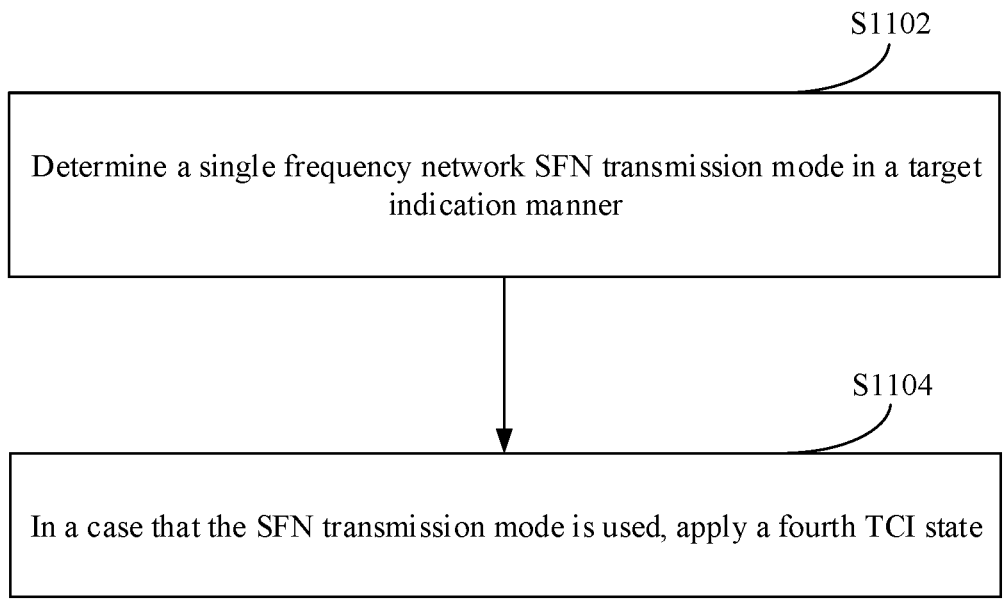
FIG. 11 is a schematic flowchart of a transmission mode determining method according to an embodiment of the present invention.

As shown in FIG. 11, an embodiment of the present invention provides a transmission mode determining method 1100. The method may be executed by a terminal device and/or a network device. In other words, the method may be executed by software or hardware installed in the terminal device and/or the network device. The method includes the following steps.

S1102: Determine a single frequency network SFN transmission mode in a target indication manner.

S1104: In a case that the SFN transmission mode is used, apply a fourth TCI state.

At least two target downlink reference signal resources are present in a plurality of downlink reference signal resources associated with the fourth TCI state, and a QCL-Type corresponding to the target downlink reference signal resource is non-QCL-TypeD.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, after the determining a single frequency network SFN transmission mode in a target indication manner, the method further includes: jointly referring to a repetition element in the QCL-Type of the at least two target downlink reference signal resources.

It should be noted that, for the transmission mode determining method provided by the embodiments of this application, the execution body may be a transmission mode determining apparatus, or a control module for executing the method in the apparatus. In the embodiments of this application, the transmission mode determining method provided in the embodiments of this application is described by using the transmission mode determining method being executed by the transmission mode determining apparatus as an example.

Figure 12:
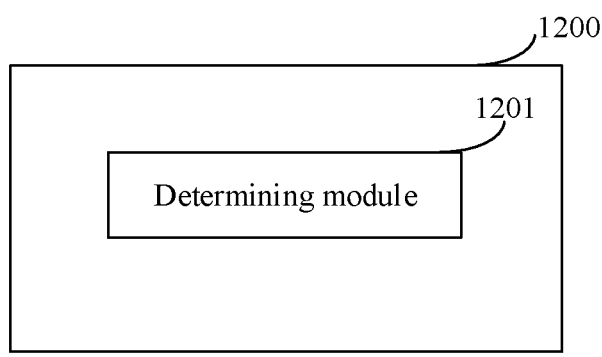
FIG. 12 is a schematic structural diagram of a transmission mode determining apparatus according to an embodiment of the present invention.

FIG. 12 is a schematic structural diagram of a transmission mode determining apparatus according to an embodiment of the present invention. As shown in FIG. 12, the transmission mode determining apparatus 1200 includes: a determining module 1201.

The determining module 1201 is configured to determine a single frequency network SFN transmission mode in a target indication manner, where the target indication manner includes one of the following manners: indication by radio resource control RRC signaling, indication by a target transmission configuration indicator state TCI state, a manner with a configured or indicated target parameter satisfying a predetermined parameter requirement, and indication of a physical downlink control channel PDCCH using the SFN transmission mode.

In an implementation, the transmission mode determining apparatus 1200 may further include: a selection module, where the selection module is configured to select at least one of the target indication manners to determine the SFN transmission mode.

In an implementation, in a case that the target indication manner is the indication by RRC signaling, the RRC signaling is configured with SFN indication information representing the SFN transmission mode, and the determining module 1201 is configured to determine, based on the SFN indication information, whether to use the SFN transmission mode.

In an implementation, in a case that the RRC signaling is configured with the SFN indication information representing the SFN transmission mode, the determining module 1201 is further configured to enable the SFN transmission mode by using first signaling, where the first signaling is indicated by using a medium access control control element MAC CE or downlink control information DCI.

In an implementation, in a case that the target indication manner is the indication by a target TCI state and the target TCI state is a first target TCI state, the first target TCI state is associated with a first target quasi-co-location type QCL-type, and the first target QCL-type includes at least one of the following QCL-types: a first QCL-Type, where an element included in the first QCL-Type is delay spread; a second QCL-Type, where elements included in the second QCL-Type are average delay and delay spread; a third QCL-Type, where elements included in the third QCL-Type are Doppler spread, average delay, and delay spread; and a fourth QCL-Type, where elements included in the fourth QCL-Type are Doppler shift, Doppler spread, and delay spread.

In an implementation, the determining module 1201 is configured to: in a case that a first preset condition is satisfied, determine the SFN transmission mode based on the first target TCI state, where the first preset condition includes at least one of the following: for physical downlink shared channel PDSCH or physical downlink control channel PDCCH, a TCI state associated with the first target QCL-type is present in TCI states configured by using RRC; for PDSCH, a TCI state associated with the first target QCL-type is present in TCI states activated by using MAC CE; for PDCCH, a TCI state associated with the first target QCL-type is present in TCI states indicated by using MAC CE; and for PDSCH, a TCI state associated with the first target QCL-type is present in TCI states indicated by using DCI.

In an implementation, in a case that the target indication manner is the indication by a target TCI state and the target TCI state is a second target TCI state, the second target TCI state is associated with a target association relationship between uplink signals and downlink signals, and an element included in the target association relationship between uplink signals and downlink signals includes Doppler shift.

In an implementation, the determining module 1201 is configured to: in a case that a second preset condition is satisfied, determine the SFN transmission mode based on the second target TCI state, where the second preset condition includes at least one of the following: for PDSCH or PDCCH, a TCI state associated with the target association relationship between uplink signals and downlink signals is present in TCI states configured by using RRC; for PDSCH, a TCI state associated with the target association relationship between uplink signals and downlink signals is present in TCI states activated by using MAC CE; for PDCCH, a TCI state associated with the target association relationship between uplink signals and downlink signals is present in TCI states indicated by using MAC CE; and for PDSCH, a TCI state associated with the target association relationship between uplink signals and downlink signals is present in TCI states indicated by using DCI.

In an implementation, in a case that the target indication manner is the indication by a target TCI state and the target TCI state is a third target TCI state, at least two target downlink reference signal resources are present in a plurality of downlink reference signal resources associated with the third target TCI state, and a QCL-Type corresponding to the target downlink reference signal resource is non-QCL-TypeD.

In an implementation, the determining module 1201 is configured to: in a case that a third preset condition is satisfied, determining the SFN transmission mode based on the third target TCI state, where the third preset condition includes at least one of the following: for physical downlink shared channel PDSCH or physical downlink control channel PDCCH, the third target TCI state is present in TCI states configured by using RRC; for PDSCH, the third target TCI state is present in TCI states activated by using MAC CE; for PDCCH, the third target TCI state is present in TCI states indicated by using MAC CE; and for PDSCH, the third target TCI state is present in TCI states indicated by using DCI.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, the determining module 1201 is further configured to: after determining the single frequency network SFN transmission mode, jointly refer to a repetition element in the QCL-Type of the at least two target downlink reference signal resources.

In an implementation, in a case that the target indication manner is the manner with the configured or indicated target parameter satisfying the predetermined parameter requirement, the predetermined parameter requirement is: the number of target code division multiplexing CDM groups that is for a PDSCH demodulation reference signal DMRS port and that is indicated by using DCI is a predetermined group quantity, the number of corresponding TCI states is a predetermined type, and no predetermined enabling parameter configuration is present in an RRC configuration parameter.

In an implementation, the determining module 1201 is configured to: in a case that the target indication manner is the indication manner with PDCCH using the SFN transmission mode, and in a case that the PDCCH is transmitted in the SFN transmission mode, implicitly indicate using the SFN transmission mode for PDSCH.

In an implementation, in a case that a predetermined parameter is included in an RRC parameter, one transport block is transmitted on a plurality of slot-level PDSCHs, and PDSCHs in all slots are transmitted in the SFN transmission mode.

In an implementation, in a case that a predetermined enabling parameter has been configured, the predetermined enabling parameter is caused not to take effect.

In an implementation, the determining module 1201 is further configured to: in a case that the SFN transmission mode is used, determine to use a frequency shift pre-compensation function in a target case, where the target case includes one of the following: a case that second signaling used for indicating enabling of the frequency shift pre-compensation function is configured or indicated; a case that a TCI state indicated by using third signaling is associated with an association relationship between uplink signals and downlink signals, and an element of the association relationship includes Doppler shift; a case that a TCI state indicated by using fourth signaling is associated with a second target QCL-Type, and an element corresponding to the second target QCL-Type does not include Doppler shift; and a case that fifth signaling is used to indicate that a target tracking reference signal TRS or a target synchronization signal block SSB resource is used as an anchor for adjusting carrier frequency and/or timing.

In an implementation, in a case that use of the frequency shift pre-compensation function is determined, an uplink frequency is adjusted based on a Doppler shift in a TCI state corresponding to PDSCH or PDCCH DMRS.

In an implementation, the determining module 1201 is further configured to: in a case that the SFN transmission mode is used, apply a fourth TCI state, where at least two target downlink reference signal resources are present in a plurality of downlink reference signal resources associated with the fourth TCI state, and a QCL-Type corresponding to the target downlink reference signal resource is non-QCL-TypeD.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, the determining module 1201 is further configured to: after determining the single frequency network SFN transmission mode, jointly refer to a repetition element in the QCL-Type of the at least two target downlink reference signal resources.

The transmission mode determining apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The transmission mode determining apparatus in this embodiment of this application may be an apparatus with an operating system. The operating system may be an Android operating system, an iOS operating system, or other possible operating systems, and is not specifically limited in the embodiments of this application.

For the apparatus 1200 in this embodiment of the present invention, reference may be made to the processes of the methods 200-1100 in the corresponding embodiments of the present invention, and the units or modules of the apparatus 1200 and other operations and/or functions described above are used to implement the corresponding processes in the methods 200-1100, with the same or equivalent technical effects achieved. For brevity, details are not repeated herein.

Figure 13:
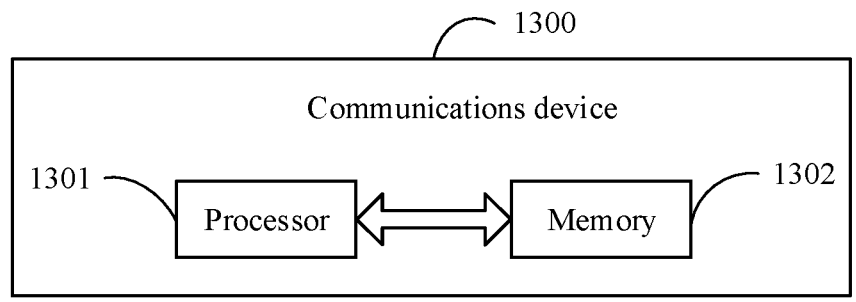
FIG. 13 is a schematic structural diagram of a communications device according to another embodiment of the present invention.

Optionally, as shown in FIG. 13, an embodiment of this application further provides a communications device 1300, including a processor 1301 a memory 1302, and a program or instructions stored in the memory 1302 and capable of running on the processor 1301. For example, when the communications device 1300 is a terminal and when the program or the instructions are executed by the processor 1301, the processes of the foregoing embodiment of the transmission mode determining method are implemented, with the same technical effects achieved. When the communications device 1300 is a network-side device and when the program or the instructions are executed by the processor 1301, the processes of the foregoing embodiment of the transmission mode determining method are implemented, with the same technical effects achieved. To avoid repetition, details are not described herein again.

Figure 14:
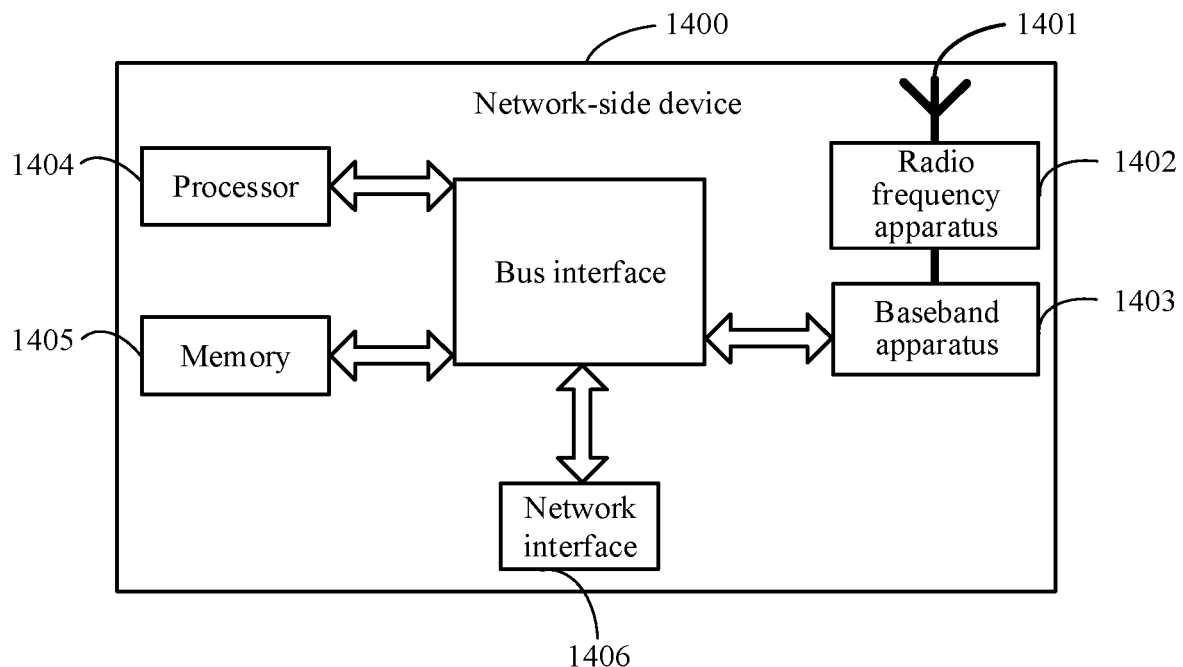
FIG. 14 is a schematic structural diagram of a network device according to another embodiment of the present invention.

Specifically, an embodiment of this application further provides a network-side device. As shown in FIG. 14, the network device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and sends the received information to the baseband apparatus 1403 for processing. In a downlink direction, the baseband apparatus 1403 processes to-be-sent information, and sends the information to the radio frequency apparatus 1402; and the radio frequency apparatus 1402 processes the received information and then sends the information out by using the antenna 1401.

The frequency band processing apparatus may be located in the baseband apparatus 1403. The method performed by the network-side device in the foregoing embodiments may be implemented in the baseband apparatus 1403, and the baseband apparatus 1403 includes a processor 1404 and a memory 1405.

The baseband apparatus 1403 may include, for example, at least one baseband board, where a plurality of chips are disposed on the baseband board. As shown in the figure, one of the chips, for example, the processor 1404, is connected to the memory 1405, to invoke a program in the memory 1405 to perform the operation of the network device shown in the foregoing method embodiments.

The baseband apparatus 1403 may further include a network interface 1406, configured to exchange information with the radio frequency apparatus 1402, where the interface is, for example, a common public radio interface (CPRI).

Specifically, the network-side device in this embodiment of the present invention further includes: instructions or a program stored in the memory 1405 and capable of running on the processor 1404. The processor 1404 invokes the instructions or program in the memory 1405 to execute the following: determining a single frequency network SFN transmission mode in a target indication manner, where the target indication manner includes one of the following manners: indication by radio resource control RRC signaling, indication by a target transmission configuration indicator state TCI state, a manner with a configured or indicated target parameter satisfying a predetermined parameter requirement, and indication of a physical downlink control channel PDCCH using the SFN transmission mode.

In an implementation, in a case that the target indication manner is the indication by RRC signaling, the RRC signaling is configured with SFN indication information representing the SFN transmission mode, and the determining a single frequency network SFN transmission mode in a target indication manner includes: determining, based on the SFN indication information, whether to use the SFN transmission mode.

In an implementation, in a case that the RRC signaling is configured with the SFN indication information representing the SFN transmission mode, the SFN transmission mode is enabled by using first signaling, where the first signaling is indicated by using a medium access control control element MAC CE or downlink control information DCI.

In an implementation, in a case that the target indication manner is the indication by a target TCI state and the target TCI state is a first target TCI state, the first target TCI state is associated with a first target quasi-co-location type QCL-type, and the first target QCL-type includes at least one of the following QCL-types: a first QCL-Type, where an element included in the first QCL-Type is delay spread; a second QCL-Type, where elements included in the second QCL-Type are average delay and delay spread; a third QCL-Type, where elements included in the third QCL-Type are Doppler spread, average delay, and delay spread; and a fourth QCL-Type, where elements included in the fourth QCL-Type are Doppler shift, Doppler spread, and delay spread.

In an implementation, the determining a single frequency network SFN transmission mode in a target indication manner includes: in a case that a first preset condition is satisfied, determining the SFN transmission mode based on the first target TCI state, where the first preset condition includes at least one of the following: for physical downlink shared channel PDSCH or physical downlink control channel PDCCH, a TCI state associated with the first target QCL-type is present in TCI states configured by using RRC; for PDSCH, a TCI state associated with the first target QCL-type is present in TCI states activated by using MAC CE; for PDCCH, a TCI state associated with the first target QCL-type is present in TCI states indicated by using MAC CE; and for PDSCH, a TCI state associated with the first target QCL-type is present in TCI states indicated by using DCI.

In an implementation, in a case that the target indication manner is the indication by a target TCI state and the target TCI state is a second target TCI state, the second target TCI state is associated with a target association relationship between uplink signals and downlink signals, and an element included in the target association relationship between uplink signals and downlink signals includes Doppler shift.

In an implementation, the determining a single frequency network SFN transmission mode in a target indication manner includes: in a case that a second preset condition is satisfied, determining the SFN transmission mode based on the second target TCI state, where the second preset condition includes at least one of the following: for PDSCH or PDCCH, a TCI state associated with the target association relationship between uplink signals and downlink signals is present in TCI states configured by using RRC; for PDSCH, a TCI state associated with the target association relationship between uplink signals and downlink signals is present in TCI states activated by using MAC CE; for PDCCH, a TCI state associated with the target association relationship between uplink signals and downlink signals is present in TCI states indicated by using MAC CE; and for PDSCH, a TCI state associated with the target association relationship between uplink signals and downlink signals is present in TCI states indicated by using DCI.

In an implementation, in a case that the target indication manner is the indication by a target TCI state and the target TCI state is a third target TCI state, at least two target downlink reference signal resources are present in a plurality of downlink reference signal resources associated with the third target TCI state, and a QCL-Type corresponding to the target downlink reference signal resource is non-QCL-TypeD.

In an implementation, the determining a single frequency network SFN transmission mode in a target indication manner includes: in a case that a third preset condition is satisfied, determining the SFN transmission mode based on the third target TCI state, where the third preset condition includes at least one of the following: for physical downlink shared channel PDSCH or physical downlink control channel PDCCH, the third target TCI state is present in TCI states configured by using RRC; for PDSCH, the third target TCI state is present in TCI states activated by using MAC CE; for PDCCH, the third target TCI state is present in TCI states indicated by using MAC CE; and for PDSCH, the third target TCI state is present in TCI states indicated by using DCI.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, after the determining a single frequency network SFN transmission mode in a target indication manner, the following is performed: jointly referring to a repetition element in the QCL-Type of the at least two target downlink reference signal resources.

In an implementation, in a case that the target indication manner is the manner with the configured or indicated target parameter satisfying the predetermined parameter requirement, the predetermined parameter requirement is: the number of target code division multiplexing CDM groups that is for a PDSCH demodulation reference signal DMRS port and that is indicated by using DCI is a predetermined group quantity, the number of corresponding TCI states is a predetermined type, and no predetermined enabling parameter configuration is present in an RRC configuration parameter.

In an implementation, in a case that the target indication manner is the indication manner with PDCCH using the SFN transmission mode, the determining a single frequency network SFN transmission mode in a target indication manner includes: in a case that the PDCCH is transmitted in the SFN transmission mode, implicitly indicating using the SFN transmission mode for PDSCH.

In an implementation, in a case that a predetermined parameter is included in an RRC parameter, one transport block is transmitted on a plurality of slot-level PDSCHs, and PDSCHs in all slots are transmitted in the SFN transmission mode.

In an implementation, in a case that a predetermined enabling parameter has been configured, the predetermined enabling parameter is caused not to take effect.

In an implementation, the following is performed: in a case that the SFN transmission mode is used, determining to use a frequency shift pre-compensation function in a target case, where the target case includes one of the following: a case that second signaling used for indicating enabling of the frequency shift pre-compensation function is configured or indicated; a case that a TCI state indicated by using third signaling is associated with an association relationship between uplink signals and downlink signals, and an element of the association relationship includes Doppler shift; a case that a TCI state indicated by using fourth signaling is associated with a second target QCL-Type, and an element corresponding to the second target QCL-Type does not include Doppler shift; and a case that fifth signaling is used to indicate that a target tracking reference signal TRS or a target synchronization signal block SSB resource is used as an anchor for adjusting carrier frequency and/or timing.

In an implementation, in a case that use of the frequency shift pre-compensation function is determined, an uplink frequency is adjusted based on a Doppler shift in a TCI state corresponding to PDSCH or PDCCH DMRS.

In an implementation, the following is performed: in a case that the SFN transmission mode is used, apply a fourth TCI state, where at least two target downlink reference signal resources are present in a plurality of downlink reference signal resources associated with the fourth TCI state, and a QCL-Type corresponding to the target downlink reference signal resource is non-QCL-TypeD.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, after the determining a single frequency network SFN transmission mode in a target indication manner, the following is performed: jointly referring to a repetition element in the QCL-Type of the at least two target downlink reference signal resources. Specific steps performed by the processor 1404 are the methods performed in the steps shown in FIGS. 2 to 11, with the same technical effects achieved. To avoid repetition, details are not described herein again.

Figure 15:
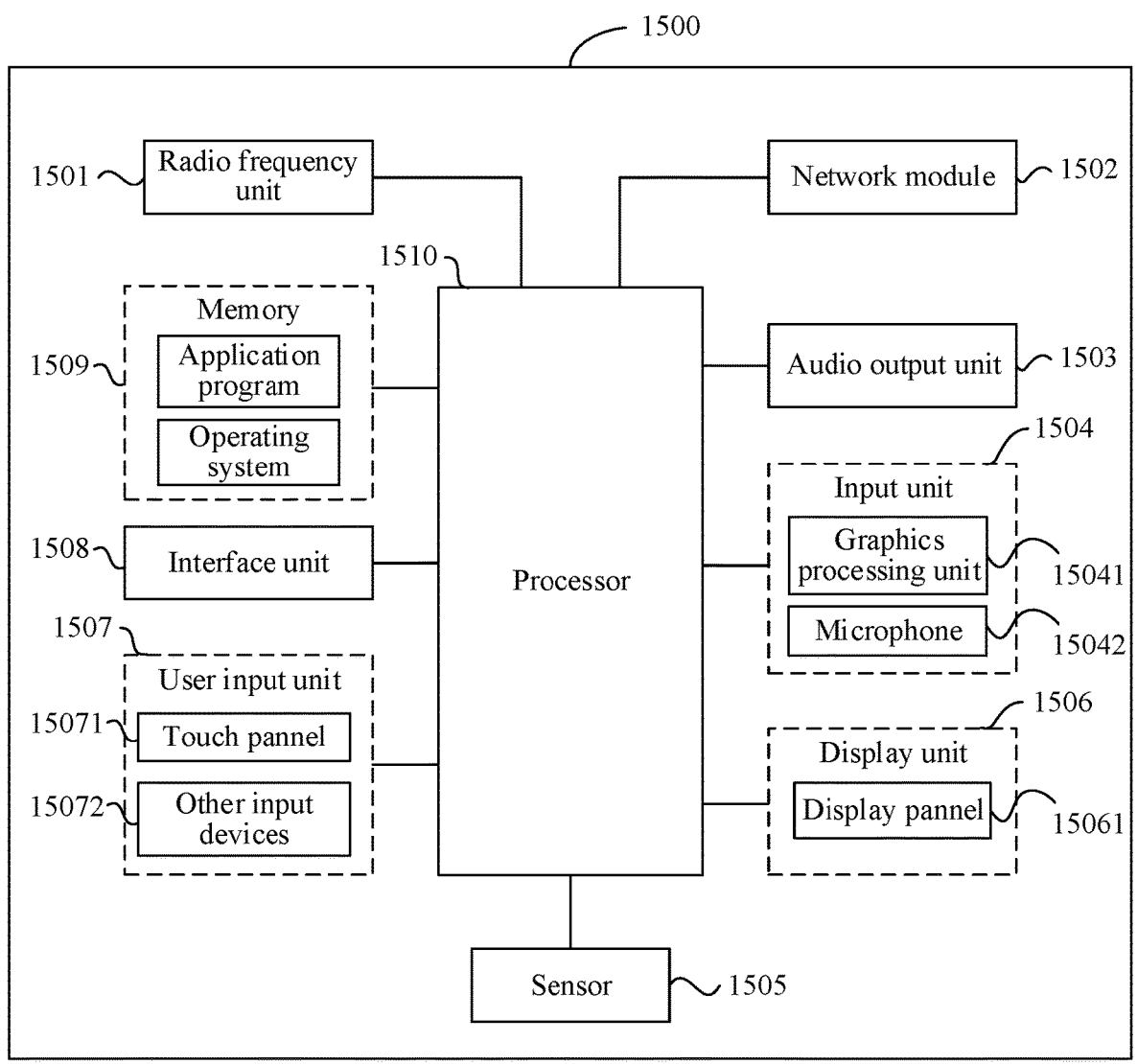
FIG. 15 is a schematic structural diagram of a terminal device according to another embodiment of the present invention.

FIG. 15 is a schematic diagram of a hardware structure of a terminal device for implementing the embodiments of this application.

The terminal device 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, and a processor 1510.

Persons skilled in the art can understand that the terminal device 1500 may further include a power supply (for example, a battery) supplying power to the components, and the power supply may be logically connected to the processor 1510 through a power management system. In this way, functions such as charge management, discharge management, and power consumption management are implemented by using the power management system. The structure of the terminal device shown in the figure does not constitute any limitation on the terminal device. The terminal device may include more or fewer components than shown in the figure, or a combination of some components, or the components disposed differently. Details are not described herein again.

It can be understood that in this embodiment of this application, the input unit 1504 may include a graphics processing unit (GPU) 15041 and a microphone 15042. The graphics processing unit 15041 processes image data of a still picture or video obtained by an image capture apparatus (such as a camera) in a video capture mode or an image capture mode. The display unit 1506 may include a display panel 15061, and the display panel 15061 may be configured in a form of a liquid crystal display, an organic light-emitting diode, and the like. The user input unit 1507 may include a touch panel 15071 and other input devices 15072. The touch panel 15071 is also referred to as a touchscreen. The touch panel 15071 may include two parts: a touch detection apparatus and a touch controller. The other input devices 15072 may include but are not limited to a physical keyboard, a function key (such as a volume control key or a power on/off key), a trackball, a mouse, a joystick, and the like. Details are not described herein.

In this embodiment of this application, the radio frequency unit 1501 receives downlink data from a network-side device, and then sends the downlink data to the processor 1510 for processing; and also sends uplink data to the network-side device. Generally, the radio frequency unit 1501 includes but is not limited to an antenna, at least one amplifier, a transceiver, a coupler, a low noise amplifier, a duplexer, and the like.

The memory 1509 may be configured to store software programs or instructions and various data. The memory 1509 may include a program or instruction storage area and a data storage area. The program or instruction storage area may store an operating system, an application program or instruction required by at least one function (for example, a sound playback function or an image playback function), and the like. In addition, the memory 1509 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 1510 may include one or more processing units. Optionally, an application processor and a modem processor may be integrated in the processor 1510. The application processor primarily processes an operating system, user interfaces, application programs or instructions, and the like. The modem processor primarily processes radio communication, for example, being a baseband processor. It can be understood that the modem processor may alternatively be not integrated in the processor 1510.

The processor 1510 may be configured to determine a single frequency network SFN transmission mode in a target indication manner, where the target indication manner includes one of the following manners: indication by radio resource control RRC signaling, indication by a target transmission configuration indicator state TCI state, a manner with a configured or indicated target parameter satisfying a predetermined parameter requirement, and indication of a physical downlink control channel PDCCH using the SFN transmission mode.

In an implementation, in a case that the target indication manner is the indication by RRC signaling, the RRC signaling is configured with SFN indication information representing the SFN transmission mode, and the determining a single frequency network SFN transmission mode in a target indication manner includes: determining, based on the SFN indication information, whether to use the SFN transmission mode.

In an implementation, in a case that the RRC signaling is configured with the SFN indication information representing the SFN transmission mode, the SFN transmission mode is enabled by using first signaling, where the first signaling is indicated by using a medium access control control element MAC CE or downlink control information DCI.

In an implementation, in a case that the target indication manner is the indication by a target TCI state and the target TCI state is a first target TCI state, the first target TCI state is associated with a first target quasi-co-location type QCL-type, and the first target QCL-type includes at least one of the following QCL-types: a first QCL-Type, where an element included in the first QCL-Type is delay spread; a second QCL-Type, where elements included in the second QCL-Type are average delay and delay spread; a third QCL-Type, where elements included in the third QCL-Type are Doppler spread, average delay, and delay spread; and a fourth QCL-Type, where elements included in the fourth QCL-Type are Doppler shift, Doppler spread, and delay spread.

In an implementation, the determining a single frequency network SFN transmission mode in a target indication manner includes: in a case that a first preset condition is satisfied, determining the SFN transmission mode based on the first target TCI state, where the first preset condition includes at least one of the following: for physical downlink shared channel PDSCH or physical downlink control channel PDCCH, a TCI state associated with the first target QCL-type is present in TCI states configured by using RRC; for PDSCH, a TCI state associated with the first target QCL-type is present in TCI states activated by using MAC CE; for PDCCH, a TCI state associated with the first target QCL-type is present in TCI states indicated by using MAC CE; and for PDSCH, a TCI state associated with the first target QCL-type is present in TCI states indicated by using DCI.

In an implementation, in a case that the target indication manner is the indication by a target TCI state and the target TCI state is a second target TCI state, the second target TCI state is associated with a target association relationship between uplink signals and downlink signals, and an element included in the target association relationship between uplink signals and downlink signals includes Doppler shift.

In an implementation, the determining a single frequency network SFN transmission mode in a target indication manner includes: in a case that a second preset condition is satisfied, determining the SFN transmission mode based on the second target TCI state, where the second preset condition includes at least one of the following: for PDSCH or PDCCH, a TCI state associated with the target association relationship between uplink signals and downlink signals is present in TCI states configured by using RRC; for PDSCH, a TCI state associated with the target association relationship between uplink signals and downlink signals is present in TCI states activated by using MAC CE; for PDCCH, a TCI state associated with the target association relationship between uplink signals and downlink signals is present in TCI states indicated by using MAC CE; and for PDSCH, a TCI state associated with the target association relationship between uplink signals and downlink signals is present in TCI states indicated by using DCI.

In an implementation, in a case that the target indication manner is the indication by a target TCI state and the target TCI state is a third target TCI state, at least two target downlink reference signal resources are present in a plurality of downlink reference signal resources associated with the third target TCI state, and a QCL-Type corresponding to the target downlink reference signal resource is non-QCL-TypeD.

In an implementation, the determining a single frequency network SFN transmission mode in a target indication manner includes: in a case that a third preset condition is satisfied, determining the SFN transmission mode based on the third target TCI state, where the third preset condition includes at least one of the following: for physical downlink shared channel PDSCH or physical downlink control channel PDCCH, the third target TCI state is present in TCI states configured by using RRC; for PDSCH, the third target TCI state is present in TCI states activated by using MAC CE; for PDCCH, the third target TCI state is present in TCI states indicated by using MAC CE; and for PDSCH, the third target TCI state is present in TCI states indicated by using DCI.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, after the determining a single frequency network SFN transmission mode in a target indication manner, the following is performed: jointly referring to a repetition element in the QCL-Type of the at least two target downlink reference signal resources.

In an implementation, in a case that the target indication manner is the manner with the configured or indicated target parameter satisfying the predetermined parameter requirement, the predetermined parameter requirement is: the number of target code division multiplexing CDM groups that is for a PDSCH demodulation reference signal DMRS port and that is indicated by using DCI is a predetermined group quantity, the number of corresponding TCI states is a predetermined type, and no predetermined enabling parameter configuration is present in an RRC configuration parameter.

In an implementation, in a case that the target indication manner is the indication manner with PDCCH using the SFN transmission mode, the determining a single frequency network SFN transmission mode in a target indication manner includes: in a case that the PDCCH is transmitted in the SFN transmission mode, implicitly indicating using the SFN transmission mode for PDSCH.

In an implementation, in a case that a predetermined parameter is included in an RRC parameter, one transport block is transmitted on a plurality of slot-level PDSCHs, and PDSCHs in all slots are transmitted in the SFN transmission mode.

In an implementation, in a case that a predetermined enabling parameter has been configured, the predetermined enabling parameter is caused not to take effect.

In an implementation, the following is performed: in a case that the SFN transmission mode is used, determining to use a frequency shift pre-compensation function in a target case, where the target case includes one of the following: a case that second signaling used for indicating enabling of the frequency shift pre-compensation function is configured or indicated; a case that a TCI state indicated by using third signaling is associated with an association relationship between uplink signals and downlink signals, and an element of the association relationship includes Doppler shift; a case that a TCI state indicated by using fourth signaling is associated with a second target QCL-Type, and an element corresponding to the second target QCL-Type does not include Doppler shift; and a case that fifth signaling is used to indicate that a target tracking reference signal TRS or a target synchronization signal block SSB resource is used as an anchor for adjusting carrier frequency and/or timing.

In an implementation, in a case that use of the frequency shift pre-compensation function is determined, an uplink frequency is adjusted based on a Doppler shift in a TCI state corresponding to PDSCH or PDCCH DMRS.

In an implementation, the following is performed: in a case that the SFN transmission mode is used, apply a fourth TCI state, where at least two target downlink reference signal resources are present in a plurality of downlink reference signal resources associated with the fourth TCI state, and a QCL-Type corresponding to the target downlink reference signal resource is non-QCL-TypeD.

In an implementation, in a case that the target downlink reference signal resources correspond to a same QCL-Type, one of a plurality of downlink reference signal resources corresponding to the same QCL-Type is an anchor, and the anchor is preset or indicated by a network.

In an implementation, after the determining a single frequency network SFN transmission mode in a target indication manner, the following is performed: jointly referring to a repetition element in the QCL-Type of the at least two target downlink reference signal resources. For the terminal device 1500 in this embodiment of the present invention, reference may be made to the processes of the methods 200-1100 in the corresponding embodiments of the present invention, and the units or modules of the terminal device 1500 and other operations and/or functions described above are used to implement the corresponding processes in the methods 200-1100, with the same or equivalent technical effects achieved. For brevity, details are not repeated herein.

An embodiment of this application further provides a readable storage medium, where a program or instructions are stored in the readable storage medium. When the program or the instructions are executed by a processor, the processes of the foregoing embodiment of the transmission mode determining method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the transmission mode determining method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product includes a processor, a memory, and a program or instructions stored in the memory and capable of running on the processor, and when the program or the instructions are executed by the processor, the steps of the method according to the first aspect are implemented.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A transmission mode determining method, wherein the method is executed by a terminal device, and the method comprises:
   determining whether to use a single frequency network SFN transmission mode, in a manner of indication by radio resource control RRC signaling;
   wherein the RRC signaling is configured with SFN indication information representing the SFN transmission mode, and the determining whether to use a single frequency network SFN transmission mode, in a manner of indication by radio resource control RRC signaling, comprises:
   determining, based on the SFN indication information, whether to use the SFN transmission mode;
   the method further comprises:
   enabling the SFN transmission mode by using first signaling, wherein the first signaling is indicated by using a medium access control control element MAC CE or downlink control information DCI.

2. The method according to claim 1, wherein the MAC CE is used for activating or indicating a TCI state; or the DCI is used for indicating a TCI state.

3. The method according to claim 1, wherein in a case that a predetermined parameter is comprised in an RRC parameter, one transport block is transmitted on a plurality of slot-level PDSCHs, and PDSCHs in all slots are transmitted in the SFN transmission mode.

4. The method according to claim 3, wherein in a case that a predetermined enabling parameter has been configured, the predetermined enabling parameter is caused not to take effect.

5. The method according to claim 1, wherein the method further comprises:
   in a case that the SFN transmission mode is used, determining to use a frequency shift pre-compensation function in a target case, wherein the target case comprises one of the following:
   a case that second signaling used for indicating enabling of the frequency shift pre-compensation function is configured or indicated;
   a case that a TCI state indicated by using third signaling is associated with an association relationship between uplink signals and downlink signals, and an element of the association relationship comprises Doppler shift;
   a case that a TCI state indicated by using fourth signaling is associated with a second target QCL-Type, and an element corresponding to the second target QCL-Type does not comprise Doppler shift; and
   a case that fifth signaling is used to indicate that a target tracking reference signal TRS or a target synchronization signal block SSB resource is used as an anchor for adjusting carrier frequency and/or timing.

6. The method according to claim 5, wherein in a case that use of the frequency shift pre-compensation function is determined, an uplink frequency is adjusted based on a Doppler shift in a TCI state corresponding to PDSCH or PDCCH DMRS.

7. The method according to claim 1, wherein the method further comprises:
   in a case that the SFN transmission mode is used, applying a fourth TCI state, wherein at least two target downlink reference signal resources are present in a plurality of downlink reference signal resources associated with the fourth TCI state, and a QCL-Type corresponding to the target downlink reference signal resource is non-QCL-TypeD.

8. The method according to claim 7, wherein in a case that the target downlink reference signal resources correspond to a same QCL-Type, one of a plurality of downlink reference signal resources corresponding to the same QCL-Type is an anchor, and the anchor is preset or indicated by a network.

9. The method according to claim 7, wherein after the determining a single frequency network SFN transmission mode in a target indication manner, the method further comprises:
jointly referring to a repetition element in the QCL-Type of the at least two target downlink reference signal resources.

10. A terminal device, comprising a processor, a memory, and a program or instructions stored in the memory and capable of running on the processor, wherein when the program or the instructions are executed by the processor, the following steps are implemented:
determining whether to use a single frequency network SFN transmission mode, in a manner of indication by radio resource control RRC signaling;
wherein the RRC signaling is configured with SFN indication information representing the SFN transmission mode, and the determining whether to use a single frequency network SFN transmission mode, in a manner of indication by radio resource control RRC signaling, comprises:
determining, based on the SFN indication information, whether to use the SFN transmission mode;
wherein when the program or the instructions are executed by the processor, the following steps are further implemented:
enabling the SFN transmission mode by using first signaling, wherein the first signaling is indicated by using a medium access control control element MAC CE or downlink control information DCI.

11. A network device, comprising a processor, a memory, and a program or instructions stored in the memory and capable of running on the processor, wherein when the program or the instructions are executed by the processor, the following steps are implemented:
determining whether to use a single frequency network SFN transmission mode, in a manner of indication by radio resource control RRC signaling;
wherein the RRC signaling is configured with SFN indication information representing the SFN transmission mode, and the determining whether to use a single frequency network SFN transmission mode, in a manner of indication by radio resource control RRC signaling, comprises:
determining, based on the SFN indication information, whether to use the SFN transmission mode;
wherein when the program or the instructions are executed by the processor, the following steps are further implemented:
enabling the SFN transmission mode by using first signaling, wherein the first signaling is indicated by using a medium access control control element MAC CE or downlink control information DCI.

12. The terminal device according to claim 10, wherein the MAC CE is used for activating or indicating a TCI state; or the DCI is used for indicating a TCI state.

13. The terminal device according to claim 10, wherein in a case that a predetermined parameter is comprised in an RRC parameter, one transport block is transmitted on a plurality of slot-level PDSCHs, and PDSCHs in all slots are transmitted in the SFN transmission mode.

14. The terminal device according to claim 13, wherein in a case that a predetermined enabling parameter has been configured, the predetermined enabling parameter is caused not to take effect.

15. The terminal device according to claim 10, wherein when the program or the instructions are executed by the processor, the following steps are further implemented:
in a case that the SFN transmission mode is used, determining to use a frequency shift pre-compensation function in a target case, wherein the target case comprises one of the following:
a case that second signaling used for indicating enabling of the frequency shift pre-compensation function is configured or indicated;
a case that a TCI state indicated by using third signaling is associated with an association relationship between uplink signals and downlink signals, and an element of the association relationship comprises Doppler shift;
a case that a TCI state indicated by using fourth signaling is associated with a second target QCL-Type, and an element corresponding to the second target QCL-Type does not comprise Doppler shift; and
a case that fifth signaling is used to indicate that a target tracking reference signal TRS or a target synchronization signal block SSB resource is used as an anchor for adjusting carrier frequency and/or timing.

16. The terminal device according to claim 15, wherein in a case that use of the frequency shift pre-compensation function is determined, an uplink frequency is adjusted based on a Doppler shift in a TCI state corresponding to PDSCH or PDCCH DMRS.

17. The terminal device according to claim 10, wherein when the program or the instructions are executed by the processor, the following steps are further implemented:
in a case that the SFN transmission mode is used, applying a fourth TCI state, wherein at least two target downlink reference signal resources are present in a plurality of downlink reference signal resources associated with the fourth TCI state, and a QCL-Type corresponding to the target downlink reference signal resource is non-QCL-TypeD.

18. The terminal device according to claim 17, wherein in a case that the target downlink reference signal resources correspond to a same QCL-Type, one of a plurality of downlink reference signal resources corresponding to the same QCL-Type is an anchor, and the anchor is preset or indicated by a network.

19. The terminal device according to claim 17, wherein after the determining a single frequency network SFN transmission mode in a target indication manner, wherein when the program or the instructions are executed by the processor, the following steps are further implemented:
jointly referring to a repetition element in the QCL-Type of the at least two target downlink reference signal resources.

20. The network device according to claim 11, wherein the MAC CE is used for activating or indicating a TCI state; or the DCI is used for indicating a TCI state.

* * * * *